(12) United States Patent
Ko

(10) Patent No.: US 7,325,945 B2
(45) Date of Patent: Feb. 5, 2008

(54) ELECTRONIC DEVICE HAVING LIGHT EMITTING UNITS THEREON IN HIGH DENSITY

(75) Inventor: Chi-Yung Ko, Hsinchu (TW)

(73) Assignee: Alpha Networks Inc., Hsinchu (TW)

( * ) Notice: Subject to any disclaimer, the term of this patent is extended or adjusted under 35 U.S.C. 154(b) by 323 days.

(21) Appl. No.: 11/144,652

(22) Filed: Jun. 6, 2005

(65) Prior Publication Data

US 2006/0274523 A1 Dec. 7, 2006

(51) Int. Cl.
*F21S 13/14* (2006.01)

(52) U.S. Cl. .................... 362/252; 362/27; 362/227; 362/551

(58) Field of Classification Search ............ 362/227, 362/551, 27, 252
See application file for complete search history.

(56) References Cited

U.S. PATENT DOCUMENTS 5,319,182 A * 6/1994 Havens et al. ......... 235/462.42
5,835,269 A * 11/1998 Natori ........................ 359/448

* cited by examiner

*Primary Examiner*—Stephen F Husar
*Assistant Examiner*—Meghan K. Dunwiddie
(74) *Attorney, Agent, or Firm*—Bacon & Thomas PLLC

(57) ABSTRACT

The present invention is to provide an electronic device having a plurality of light emitting units, which are arranged on a panel of the electronic device above each ports thereon in an alternating pattern or in a chess-board pattern with high density, such that the number of the light emitting units disposed on the panel can be increased and the lights emitted by light emitting elements thereof can easily be recognized without causing the spill interference effect between the adjacent light emitting elements.

6 Claims, 4 Drawing Sheets

ELECTRONIC DEVICE HAVING LIGHT EMITTING UNITS THEREON IN HIGH DENSITY

FIELD OF THE INVENTION

The present invention relates to an electronic device, more particularly to an electronic device having light emitting units thereon in high density alternating pattern (or chess-board pattern).

BACKGROUND OF THE INVENTION

The advancement of modern technology has produced more and more electronic products that can enhance the quality and comfort of people's life. However, ordinary electronic products, such as hubs, personal computers and blade servers, all of the above employs a liquid crystal display (LCD) or a light indicator to provide users with information of the electronic products.

Referring to FIG. 1, FIG. 2 and FIG. 3, conventional hubs 10, 11, 12 comprise twelve, twenty-four or forty-eight network ports 102, 112, 122 (e.g. RJ-45 ports). Therefore, for the hubs 10, 11, 12 having high density network ports 102, 112, 122, the number of light indicators 101, 111, 121 disposed thereon for indicating the statuses of the corresponding network ports 102, 112, 122 increases correspondingly. It is thus difficult for users to realize the statuses of the network ports 102, 112, 122 of the hubs 10, 11, 12 at the first glance of the light indicators 101, 111, 121.

Referring again to FIG. 1, a panel 103 of the hub 10 comprises a plurality of upper row network ports 102 and a plurality of lower row network ports 102 adjacent and below the upper row network ports 102. In addition, the panel 103 comprises two light indicators 101 disposed above each of the upper row network port 102. The two light indicators 101 emit light indicating the statuses of the upper row and the lower row network ports 102, respectively. However, the light indicator 101 can only provide very limited information of the network ports 102 of the hub, even by using light indicators of two colors or three colors.

Referring again to FIG. 2, a panel 113 of the hub 11 comprises a plurality of upper row network ports 112 and a plurality of lower row network ports 112 adjacent and below the upper row network ports 112. In addition, the panel 113 comprises two light indicators 111 disposed at two upper corners of each the upper row network port 112 respectively. The two light indicators 111 emit light indicating the statuses of the upper row and the lower row network ports 112, respectively. If the light indicators 111 are of two-color or three-color light indicators, then six or nine different light emission statuses can be provided. However, each of the network port 112 of the hub 11 provides very limited space for disposing the light indicators 111. Therefore, the structure of the network ports 112 becomes very complicated, which will increase the manufacturing cost. In addition, since the network ports 112 and the light indicators 111 are combined together, the number of pins on each individual network port 112 is increased, thereby rendering many layout problems. For example, the number of layers of the circuit board of the hub 11 should increase in order to allow the upper row and the lower row network ports 112, and the light indicators 111 to work properly.

Further, referring again to FIG. 3, a panel 123 of the hub 12 comprises a plurality of upper row network ports 122 and a plurality of lower row network ports 122 adjacent and below the upper row network ports 122. In addition, the panel 123 comprises four light indicators 121 above each of the upper row network port 122. Two of the four light indicators 121 emit light indicating the statuses of the upper row network ports 122, while the other two light indicators 121 emit light indicating the statuses of the low row network ports 122. However, the light indicators 121 are tightly arranged together, which leaves only a very small distance between the light indicators 121. Therefore, the information shown on the light indicators 121 of the hub 12 is very hard to recognize. In addition, there is spill light interference between the light indicators 121. Consequently, it is likely that a user tends to read an erroneous light emission status. For this reason, it is deemed necessary to develop a hub that allows a plurality of light indicators to densely be disposed thereon.

SUMMARY OF THE INVENTION

In light of the drawbacks of the conventional hubs described above, the inventor of the present invention has developed an electronic device having a plurality of light emitting elements thereon in high density that can overcome the above drawbacks.

It is an object of the present invention to provide an electronic device having a plurality of light emitting units that are arranged in an alternating pattern (or in a chess-board pattern) with high density. With such a structurally simple electronic device, one can increase the number of light emitting units disposed on the panel of the electronic device without having the spill interference effect between the adjacent light indicators 121.

The above and other objects, features and advantages of the present invention will become apparent from the following detailed description taken with the accompanying drawings.

DETAILED DESCRIPTION OF THE PREFERRED EMBODIMENTS

Figure 1:
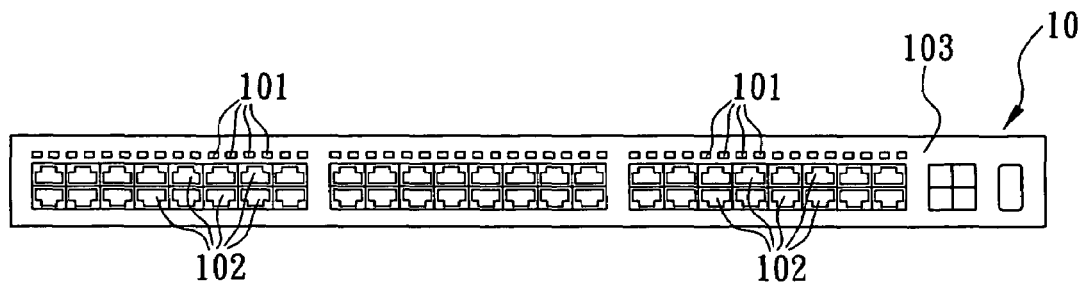
FIG. 1 illustrates a conventional hub.
Figure 2:
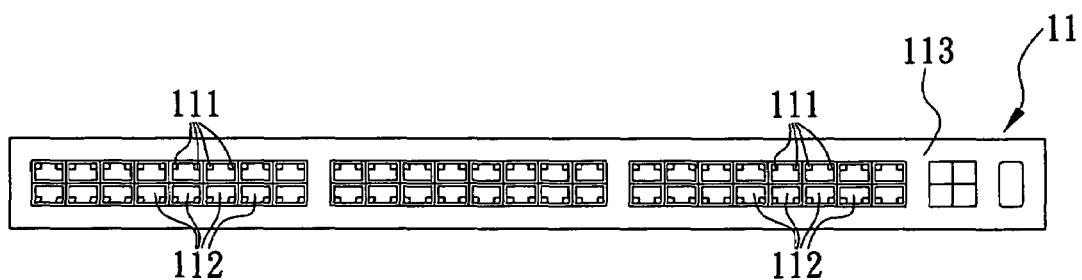
FIG. 2 illustrates another conventional hub.
Figure 3:
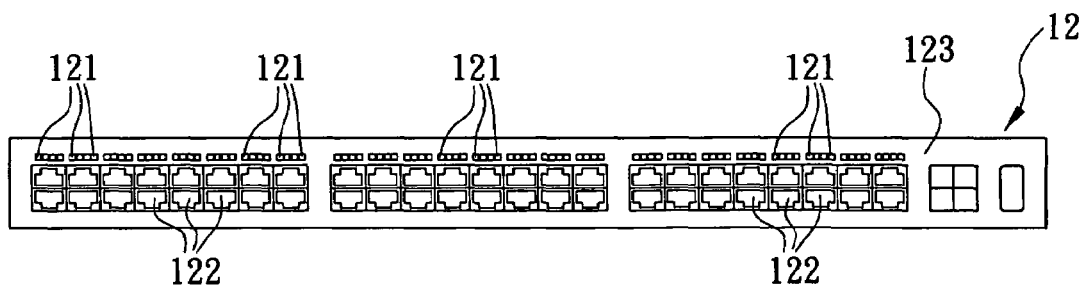
FIG. 3 illustrates yet another conventional hub.
Figure 4:
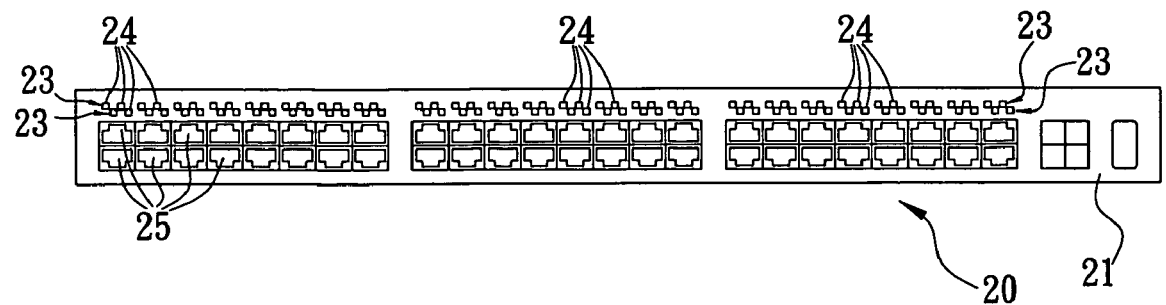
FIG. 4 illustrates an electronic device of the present invention and the display panel thereof.
Figure 6A:
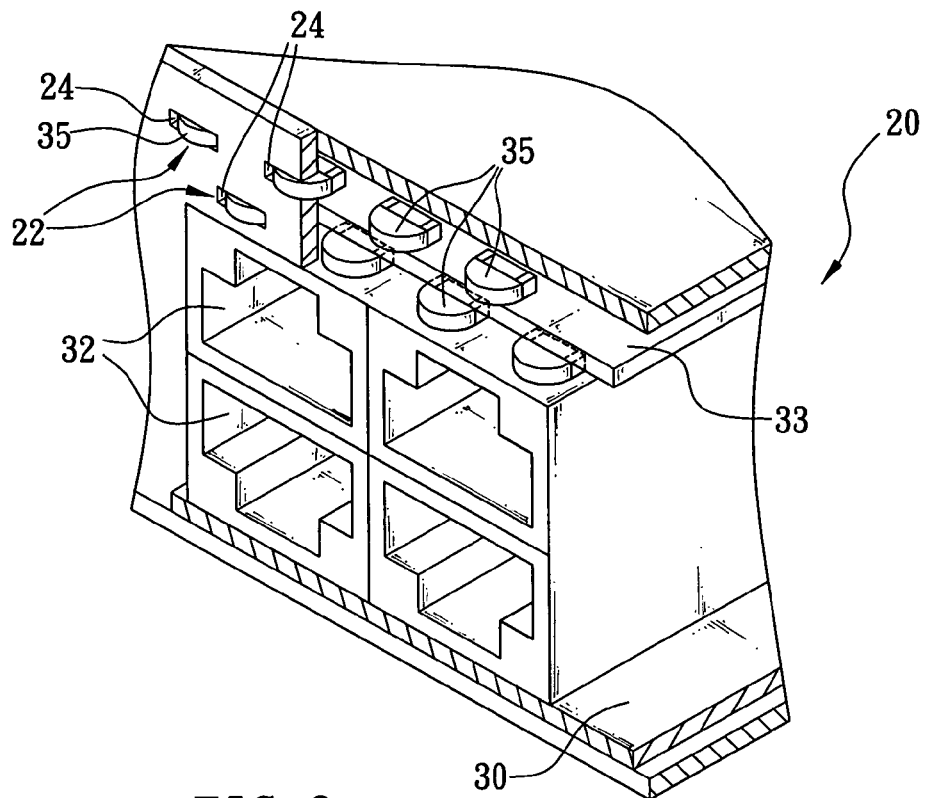
FIG. 6a illustrates the electronic device in accordance with one embodiment of the present invention.

The present invention provides an electronic device that includes a plurality of light emitting elements. These light emitting elements are disposed close to each other. Referring to FIG. 4, a display panel 21 is formed on an electronic device 20. The display panel 21 includes a plurality of light emitting units 22, which are arranged in alternating pattern (or in chess-board pattern), as shown in FIG. 6a. In this manner, the electronic device 20 can increase the number of light emitting unit 22 being disposed thereon with a simple structure design, but without having spill interference effect between the adjacent light emitting units 22. Thus, the user of the electronic device 20 can correctly read the light emitting unit 22 to obtain information of the electronic device 20.

Figure 5:
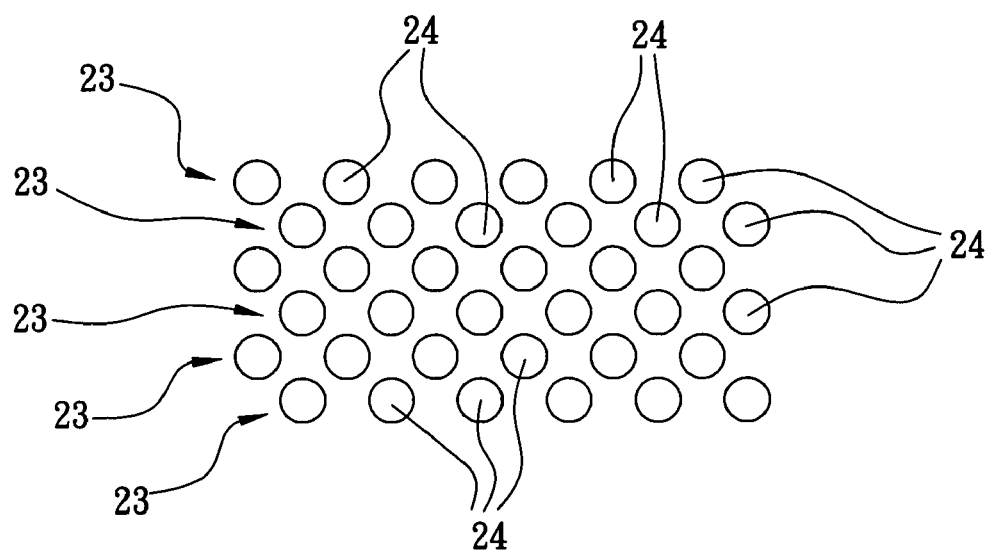
FIG. 5 illustrates the light penetrating portion of the present invention and the hollow holes thereof.

In one particular embodiment of the present invention, as shown in FIG. 4 or FIG. 5, the display panel 21 comprises a plurality of mutually adjacent light penetrating portions 23. The light penetrating portion 23 comprises a plurality of hollow holes 24 formed on the display panel 21. Each hollow hole 24 is alternatively formed. In other words, each hollow hole 24 is located between two adjacent hollow holes 24 and is shifted above or below the two adjacent hollow holes 24. The hollow holes 24 are thus formed in an alternating pattern (or in a chess-board pattern). A light emitting element 35, 43 (as shown in FIG. 6a, FIG. 6b, FIG. 7a and FIG. 7b) is formed in the hollow hole 24, thereby forming a light emitting unit 22. In addition, a plurality of mutually adjacent connection holes 25 is formed close to the position of the light penetrating portion 23. Connection elements 32, 42 are disposed in the connection holes 25 (as shown in FIG. 6a, FIG. 6b, FIG. 7a and FIG. 7b), so as to provide a connection cable 45 (as shown in FIG. 7a) of another electronic device (not shown) to insert therein.

Referring to FIG. 4, FIG. 6a, FIG. 6b, FIG. 7a and FIG. 7b, the electronic device 20 includes a circuit board 30, 40 disposed therein. The circuit board 30, 40 includes a control circuit 31, 41. The connection elements 32, 42 are connected with the control circuits 31; 41, thereby connecting those other electronic devices (not shown) together with the electronic device 20 via the connection cable 45 and its corresponding connection elements 32, 42, and transmitting data to the electronic device 20. Furthermore, the light emitting elements 35, 43 generates different types of light according to the action of the corresponding connection element 32, 42. The user of the electronic device 20 can thus read the status information of each connection element 32, 42 according the type of light that is generated.

Referring to FIG. 4 and FIG. 5, it is appreciated that the number of light penetrating portion 23 on the display panel 21 is not limited to one upper row and one lower row only. It is considered under the scope of the present invention as long as the hollow holes 24 of the light penetrating portions 23 are formed in a alternating pattern (or in a chess-board pattern) with at least a light emitting element disposed in the hollow hole 24.

Figure 6B:
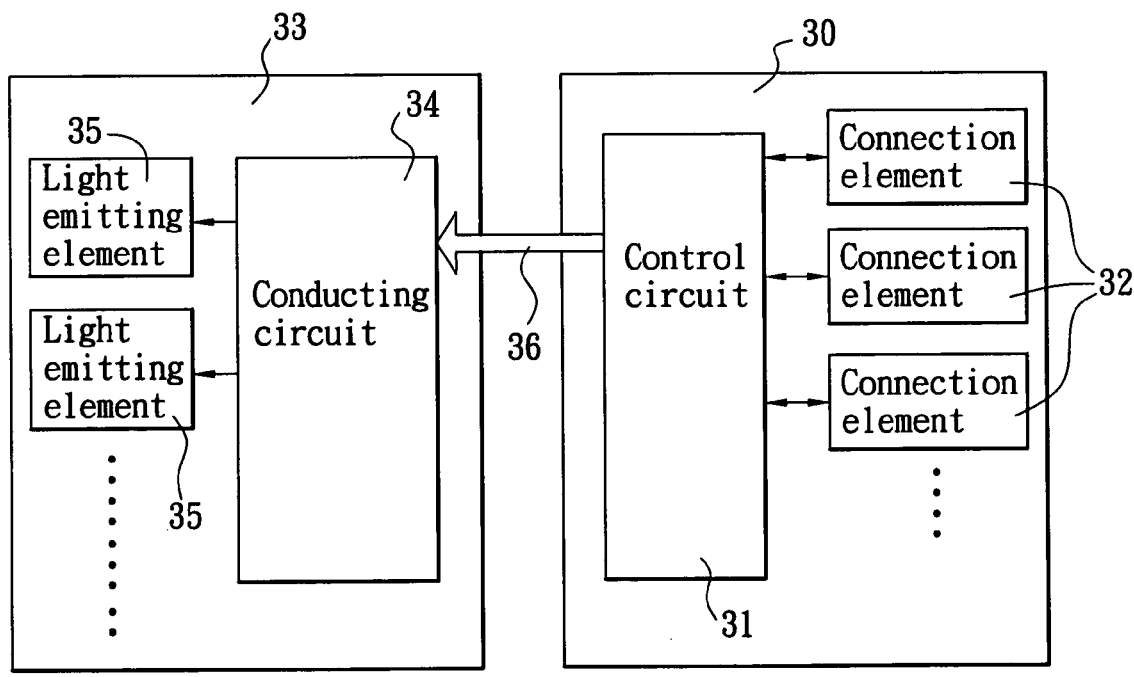
FIG. 6b is a block diagram illustrating the circuit of the electronic device of the present invention.
Figure 7A:
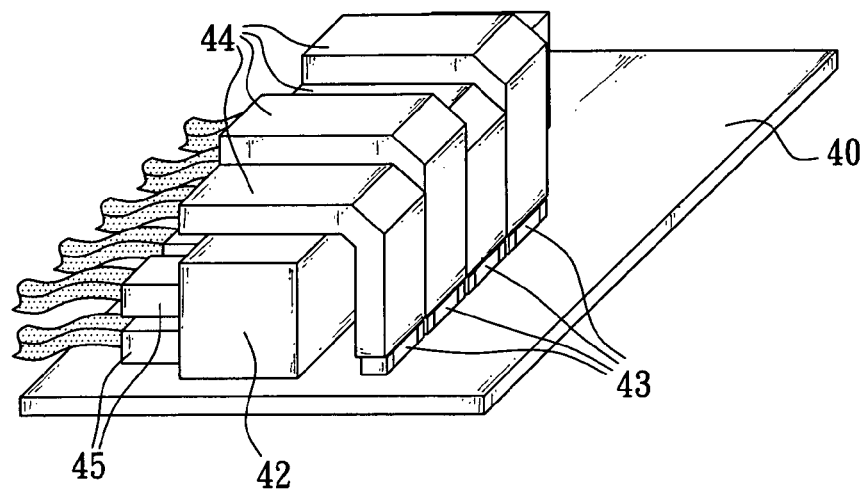
FIG. 7a illustrates the electronic device in accordance with another embodiment of the present invention.

Referring to FIG. 6a and FIG. 6b, another embodiment of the present invention is illustrated. The electronic device 20 includes a light emitting circuit board 33. The light emitting circuit board 33 is disposed between any two adjacent light penetrating portions 23 (as shown in FIG. 4). The light emitting elements 35 are then disposed on two sides of the light emitting circuit board 33 facing the hollow holes 24, so as to form light emitting units 22 comprising the hollow holes and the light emitting element 35. The light source generated from the light emitting element 35 is projected out through the corresponding hollow hole 24. In this manner, the light emitting elements 35 of the light emitting circuit board 33 are properly spaced and separated by the light emitting circuit board 33. Thus, the light source generated from the light emitting element 35 will not interfere with the light source from the adjacent light emitting element 35.

Referring to FIG. 6b, the light emitting circuit board 33 comprises a conducting circuit 34. The conducting circuit 34 is connected with each light emitting element 35 and is connected with the control circuit via at least a transmission line 36 (or cable line). The control circuit 31 can thus control the light emitting status of the light emitting element via the transmission line 36.

Figure 7B:
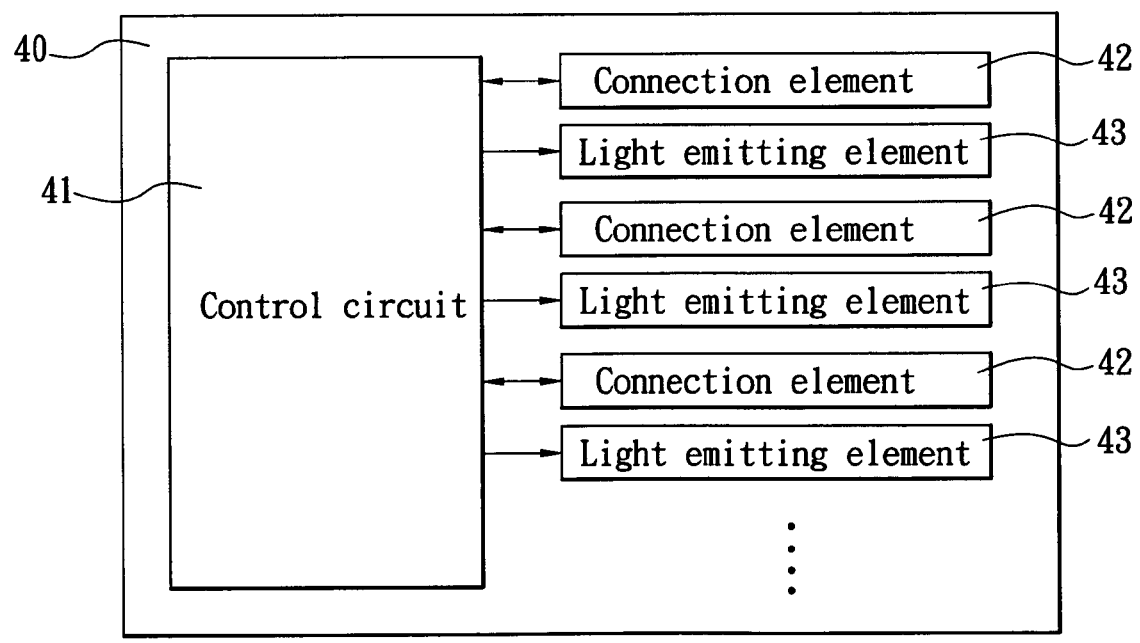
FIG. 7b is a block diagram illustrating the circuit of the electronic device of the present invention.

Referring to FIG. 7a and FIG. 7b, the light emitting elements 43 are disposed on the circuit board 40 corresponding to the position of the connection elements 42, and is connected to the control circuit 41. The control circuit 41 can then control the light emitting status of each light emitting element 43 corresponding to the usage status of each connection element 42.

Referring again to FIG. 7a and FIG. 7b, the electronic device further comprises a plurality of light guide pillar 44. One end of the light guide pillar 44 is connected to the light emitting element 43. The other end of the light guide pillar 44 is then connected to the corresponding hollow hole 24 of the display panel 21, as shown in FIG. 4. The light source generated from the light emitting element 43 can then be transmitted through the light guide pillar 44 and projected out through the hollow hole 24. Each hollow hole 24, light guide pillar 44 and light emitting element 43 form a light emitting unit 22. Therefore, the light guide pillar 44 can only transmit light source from one end to the other end. The light source projected out of two hollow holes 24 will not interfere with each other.

Referring again to FIG. 7a, the light guide pillar 44 is formed in a L-shape. The angle formed in the L-shape is approximately between 30 degrees to 180 degrees. Accordingly, the light guide pillar 44 can be adopted to satisfy the need of different electronic devices, such as a hub, a personal computer and a blade server, thereby delivering light source from the light emitting element 43 and projecting out the light source.

While the invention has been described by means of specific embodiments, numerous modifications and variations could be made thereto by those skilled in the art without departing from the scope and spirit of the invention set forth in the claims.

What is claimed is:

1. An electronic device comprising:
   a display panel;
   a circuit board, comprising a control circuit formed thereon;
   a plurality of light penetrating portions alternatively disposed on the display panel, the light penetrating portions having a plurality of hollow holes spacedly formed on the display panel, each hollow hole being positioned between two of the adjacent hollow holes of the light penetrating portions, thereby forming the hollow holes in a chess-board shape;
   a light emitting circuit board, which is disposed between two adjacent light penetrating portions, wherein a plurality of light emitting elements is disposed on two sides of the light emitting circuit board corresponding to the hollow holes, thereby forming a light emitting unit comprising the hollow holes and the light emitting elements; and
   a conducting circuit, which is disposed on the light emitting circuit board, connected with the light emitting elements, and further connected to the control circuit via at least a transmission line, so as to control the light emitting status of the light emitting element by the control circuit via the transmission line and the conducting circuit.

2. The electronic device as recited in claim 1, wherein a plurality of connection holes are formed on the display panel adjacent the light penetrating portions, and a plurality of connection elements are disposed on the circuit board corresponding the connection holes, each connection element being contained in its corresponding connection hole and being connected with the control circuit.

3. An electronic device comprising:
   a display panel;
   a circuit board, comprising a control circuit formed thereon;
   a plurality of light penetrating portions alternatively disposed on the display panel, the light penetrating portions having a plurality of hollow holes spacedly formed on the display panel, each hollow hole being positioned between two of the adjacent hollow holes of the light penetrating portions, thereby forming the hollow holes in a chess-board shape;
   a plurality of light emitting elements, which are sequentially disposed on the circuit board, each being connected with the control circuit; and
   a plurality of light guide pillars, one end of each light guide pillar being connected to the light emitting element, while the other end of the light guide pillar being connected to the corresponding hollow hole of the display panel, thereby transmitting the light source emitted from the light emitting element via the light guide pillar and projecting the light source out of the hollow hole.

4. The electronic device as recited in claim 3, wherein a plurality of connection holes are formed on the display panel adjacent the light penetrating portions, the circuit board comprising a plurality of connection elements formed thereon corresponding the connection holes, the connection elements being contained in the corresponding connection holes, so as to establish connection with the control circuit.

5. The electronic device as recited in claim 3, wherein the light guide pillars are in L-shape having an angle.

6. The electronic device as recited in claim 5, wherein the angle is approximately between 30 degrees and 180 degrees.

* * * * *